(12) United States Patent
Angelsen et al.

(10) Patent No.: US 8,137,280 B2
(45) Date of Patent: Mar. 20, 2012

(54) DIGITAL ULTRASOUND BEAM FORMER WITH FLEXIBLE CHANNEL AND FREQUENCY RANGE RECONFIGURATION

(75) Inventors: Bjørn A. J. Angelsen, Trondheim (NO); Tonni F. Johansen, Trondheim (NO)

(73) Assignee: SURF Technology AS, Trondheim (NO)

( * ) Notice: Subject to any disclaimer, the term of this patent is extended or adjusted under 35 U.S.C. 154(b) by 323 days.

(21) Appl. No.: 12/414,068

(22) Filed: Mar. 30, 2009

(65) Prior Publication Data
US 2009/0240152 A1    Sep. 24, 2009

Related U.S. Application Data

(63) Continuation-in-part of application No. 11/054,399, filed on Feb. 9, 2005, now abandoned.

(60) Provisional application No. 61/119,581, filed on Dec. 3, 2008.

(51) Int. Cl.
*A61B 8/00* (2006.01)

(52) U.S. Cl. ........................................ 600/459; 600/447

(58) Field of Classification Search .................. 600/443, 600/447, 459; 367/123, 135; 73/596; 700/275, 700/280
See application file for complete search history.

(56) References Cited

U.S. PATENT DOCUMENTS

| | | | | |
|---|---|---|---|---|
| 5,555,534 A | * | 9/1996 | Maslak et al. | 367/135 |
| 6,110,116 A | * | 8/2000 | Wright et al. | 600/447 |
| 6,570,537 B2 | * | 5/2003 | Frey, Jr. | 342/373 |
| 6,622,562 B2 | * | 9/2003 | Angelsen et al. | 73/633 |
| 7,227,813 B2 | * | 6/2007 | Miller | 367/123 |

* cited by examiner

*Primary Examiner* — Parikha Mehta
(74) *Attorney, Agent, or Firm* — Cozen O'Connor

(57) ABSTRACT

A digital ultrasound beam former for ultrasound imaging, that can be configured by a control processor to process the signals from ultrasound transducer arrays with variable number of elements at variable sampling frequencies, where the lowest sampling frequency allows for the highest number of array elements. The maximal number of array elements is reduced in the inverse proportion to the sampling frequency. The beam former can be operated both in a RF-sampling mode and a quadrature mode. Parallel coupling of transmit/receive circuits for each element allow adaption of the receive Noise Figure and transmit drive capabilities to variations in the electrical impedance of the array elements.

30 Claims, 5 Drawing Sheets c)

d)

DIGITAL ULTRASOUND BEAM FORMER WITH FLEXIBLE CHANNEL AND FREQUENCY RANGE RECONFIGURATION

CROSS REFERENCE TO RELATED APPLICATIONS

This application is a continuation-in-part of U.S. patent application Ser. No. 11/054,399, now abandoned, which was filed with the U.S. Patent and Trademark Office on Feb. 9, 2005, and which was published as US 2005/0203402 on Sep. 15, 2005. This application also claims the benefit of U.S. Provisional Application No. 61/119,581, filed Dec. 3, 2008. The content of both of application Ser. No. 11/054,399 and provisional application No. 61/119,581 are expressly incorporated herein by reference.

BACKGROUND OF THE INVENTION

1. Field of the Invention

The present invention is directed to methods and instrumentation of ultrasound imaging in a wide frequency range where the digital beamformer is reconfigurable in terms of number of channels versus frequency range.

2. Description of the Related Art

Digital ultrasound beam formers for medical ultrasound imaging have the last decade become feasible due to improved functionality of analog to digital converters (ADCs) and digital integrated circuit technology. However, the requirements on the beam former in terms of number of channels, frequency bandwidth, signal dynamic range, etc., highly depend on the application and the resolution versus depth penetration required.

The cost of the beam former per channel is dominated by the cost of the ADCs, which increases with number of bits and maximal sampling frequency of the ADC. The requirement for number of bits is determined by the required dynamic range, where blood velocity imaging in the heart puts the strongest requirement on the dynamic range (and number of bits) due to the demanding filtering of the wall signals to retrieve the blood signal for the velocity processing. Non-cardiac imaging requires less dynamic range and number of bits in the ADCs, and an increase in the center frequency and the bandwidth further reduces the dynamic range in the signal and hence the required number of bits. Reducing the transducer array element dimensions also reduces the number of required bits per channel.

It is hence a need for a beam former where the number of channels, dynamic range, and frequency range can be reconfigured for the particular application at hand.

The largest number of channels are found with the phased arrays, where the element pitch is $\lambda/2$, where $\lambda=c/f$ is the wave length of ultrasound in the tissue with ultrasound propagation velocity c (~1.54 mm/μsec) and f is the ultrasound frequency. With switched linear or curvilinear arrays, the element pitch can be increased to $\lambda$-1.5$\lambda$, increasing the aperture by a factor 2-3 compared to the phased array with the same number of elements, or allows for a reduction in the number of electronic channels in the beam former with limited increase in the aperture. With the beam axis along the surface normal of the array (no angular direction steering of the beam), one can also do analog summation of the signals for the pair of elements with symmetric location around the aperture center, hence reducing the required number of ADCs by a factor 2, or expanding the number of elements by a factor 2 with a given number of ADCs.

The annular arrays require even less number of delay channels. As the element areas are larger than for the switched arrays, their electrical impedance is proportionally less, and it is practical to parallel couple analog channels for each element of the annular array so that for similar apertures and frequencies one gets about the same number of analog channels for the annular and the switched arrays. This statement specially applies to the annular array design described in U.S. Pat. No. 6,622,562 Sep. 23, 2003, where the outer elements have specially large area.

Manufacturing technology gives a limitation on the lowest pitch of the array elements, where $\lambda/2$ pitches are achievable for frequencies up to ~10 MHz with current transducer array technology. This is hence the highest frequency where the phased array method has been used, while for higher frequencies one is using switched arrays where the lowest manufacturing pitch with current technology allows frequencies up to ~20-30 MHz. Current experimental manufacturing techniques allow frequencies of switched arrays up to ~50 MHz.

The annular arrays have the fewest number and hence the largest elements for a given aperture. They therefore allow the use of the highest frequencies, even up to ~100 MHz with current technology. One should also note that the phased array image is mainly interesting for imaging between ribs and from localized areas, where a highest frequency of ~10 MHz is adequate, while the image formats of the switched and annular arrays are applicable over the whole frequency range. With some intra-luminal catheter and surgical applications one can see the sector image format of the phased array also being attractive for frequencies above ~10 MHz. With new transducer technology based on ceramic films or micromachining of silicon (cmut—capacitive micromachined ultrasound transducers), one sees opportunities for manufacturing of phased arrays with center frequencies above ~10 MHz.

It is hence a need for a beam former that can run a large number of channels for wide aperture phased and linear arrays up to a center frequency $f_0$~15 MHz, with a less number of channels for frequencies up to $2f_0$~30 MHz with switched arrays and annular arrays, and an even less number of channels for frequencies up to $4f_0$-$7f_0$~60-100 MHz to be operated with switched and annular arrays.

SUMMARY OF THE INVENTION

In the following we summarize the most central aspects of the invention, where the summary has no intent of giving a complete specification of the invention which is defined by the claims appended hereto.

The present invention gives a solution to the need described in the Introduction, where the digital beam forming is done with in a programmable unit that are programmed by a central processor, like a PC, that provides a reconfigurable front end for different sampling rates and number of channels depending on the type of array and frequency range that is used. The beam former can connect directly to transducer array elements, or sub-aperture circuits that combine several neighboring array elements into sub-aperture channels according to known methods. We shall in the following refer to analog channels, where the analog channels can connect directly to array elements as well as to sub-aperture circuits for sub-apertures of array elements.

The beam former comprises at least the following components that are programmable (configurable) by a programmable processor, like a PC:

a set of analog transmit amplifiers and a receiver amplifiers, and with a front connection representing transmitter outputs and receiver inputs, and with a back connection representing the receiver output, and an array coupling means that provides selectable connection of analog channels of the array to the inputs of the transmitters and receivers, and a set of N analog to digital converters (ADCs), and ADC connection means that connect the receiver amplifier outputs to inputs of the ADCs, where the ADCs at their input contain programmable anti-aliasing filters and the effective sampling frequency can be set to observe either the $1^{st}$ or $2^{nd}$ harmonic component of the analog channel signal, or both, all according to known methods, and where said ADC connection means can be direct galvanic connection between the receiver amplifier outputs and the ADC inputs or a set of N multiplexers (MUXes), where the inputs of the MUXes are receiver amplifier outputs, and the outputs of the MUXes connect to the ADC inputs, and programmable digital beam forming unit that takes the outputs of said ADCs as inputs, sorts the ADC outputs into samples of the signals from individual analog channels, amplitude corrects and/or phase and/or delay corrects the individual channel signals before they are summed to form the beam formed RF signal from selected beam directions. Said beam forming unit can comprise one or more of field programmable application specific circuits (ASICs) or field programmable gate arrays (FPGAs), or software based beam forming in a general computer, like a PC, for example also with assistance processors like graphics processors.

In one embodiment according to the invention, the beam former can be configured to operate in a RF-mode, where the analog channel RF signals are sampled at an effective over sampling rate >~3* (RF frequency) and amplitude modified and/or delayed before summation to form RF beam formed signals. In this operation the ADCs are operated at a sampling frequency $f_s$, that potentially can be varied for the arrays but is often set close to the ADC maximum sampling frequency to be able to use lowest cost ADCs. The analog multiplexer allows the ADC to take input from several, selectable analog channels, allowing selectable effective sampling frequencies matched to the number of independent analog channels. When lower sampling frequencies are allowed for the signal bandwidths that are used, each ADC can through selectable activation of the MUXes digitize a number of L analog channels with a reduced effective sampling frequency by a factor L. This increases the number of analog channels that can be operated by the beam former by the factor L. At a higher bandwidth, each ADC can convert one analog channel at the sampling frequency $f_s$. At even higher bandwidths, groups of ADCs can via the array coupling means be connected to each analog channel. The groups of ADCs connected to each analog channel are divided into M subgroups of ADCs with a phase difference of the sampling frequency between each sub group of $1/Mf_s$, so that the effective sampling frequency of each analog channel is increased by a factor of M.

In another embodiment according to the invention, the beam former of the $1^{st}$ embodiment can be additionally configured to operate in a quadrature mode, where the signal from each analog channel can be coupled to the input of two quadrature subgroups of ADCs, where the sampling between the $1^{st}$ and the $2^{nd}$ quadrature subgroups of ADCs is delayed close to $1/4f_0$, where $f_0$ is close to the center of the $1^{st}$ or $2^{nd}$ harmonic component of the received RF signal. The signals from the $1^{st}$ quadrature subgroup of ADCs represent the in-phase and the signals from the $2^{nd}$ quadrature subgroup of ADCs represent the quadrature components of the analog beam former channels, and the beam forming circuits are configured to do quadrature beam forming on the signals according to known methods (I-Q beam forming).

In yet another embodiment according to the invention, the beam former can be configured to operate both in a quadrature mode as described above, and a RF-mode with reduced flexibility where the analog multiplexers of the $1^{st}$ and $2^{nd}$ embodiments of the invention are left out, removing the programming flexibility of L>1 of the two embodiments.

The number of ADCs that are typically coupled to each analog beam former channel can depend on the type of array. Where the array elements have equal sizes, like with ID linear arrays, one will typically connect the same number of ADCs to each beam former channel, while with some annular arrays the elements have different areas, for example as described in U.S. Pat. No. 6,622,562, and one would then like to connect more ADCs to the elements with larger areas. This is also the case for 1.5D and 1.75D linear arrays where the central group of elements often can have larger area than the outer elements in the elevation direction.

The digital dynamic range can be increased when groups of ADCs are connected to the same analog channel, where the outputs of ADCs with the same sample points for each analog channel are added. Where there is a delay between the sample points of the ADCs within each subgroup of ADCs to increase the effective sampling rate for each analog channel one can with lower signal bandwidths with increased sampling rates (over sampling), perform digital low pass filtering of the signals that increases the number of bits per analog channel and reduces the sampling rate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
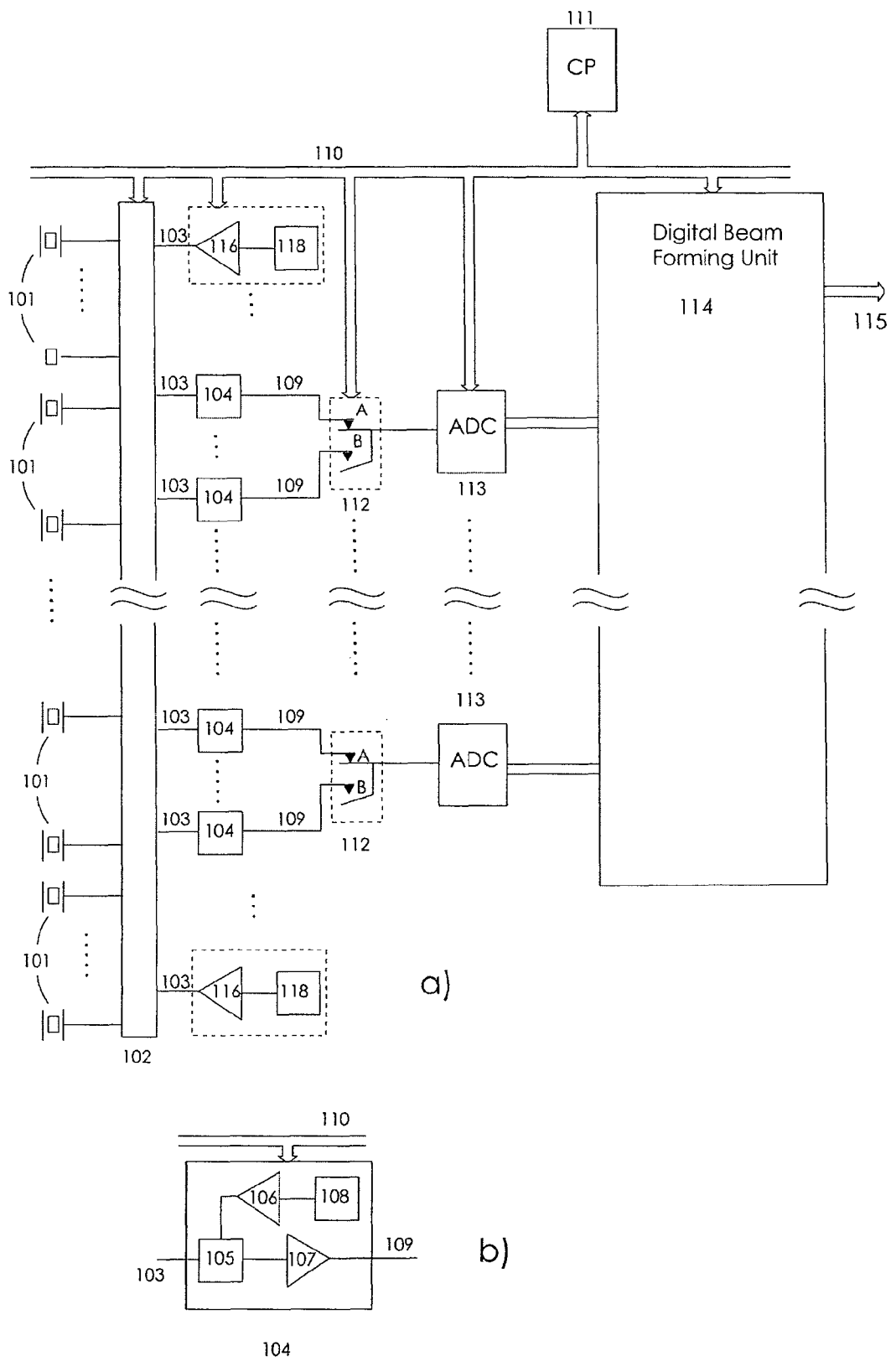
FIG. 1, shows an example embodiment of a front end according to the invention where a front end is configured to a lowest sampling frequency allowing a number of analog channels that is highest for the number of ADCs.

FIG. 1 illustrates one embodiment in the general spirit of the invention, where 101 indicates elements in an ultrasound transducer array or sub aperture groups of elements of the array with sub aperture beam forming circuits that present their outputs to the beam former from groups of elements, according to known methods. The elements or sub-aperture groups of elements are represented by analog channels, where all the analog channels are connected to an array coupling means 102, that provides selectable connection of the analog channels to the front connections 103 of transmitters 116 and/or combined transmitters and receivers 104. The array coupling means 102 is composed of both a probe connector that couples the analog channels to the instrument and in some embodiments also analog multiplexers or relays that participate in the selection of coupling analog channels to the transmitter and receiver amplifiers.

FIG. 1*b* shows an example composition of combined transmitters and receivers, where the front connection 103 connects to a transmit/receive switch 105, that connects the transducer array to transmit amplifier output 106 during the pulse transmit period, and to receiver amplifier input 107 during the receive period. The transmit amplifiers are driven from signal generators 108 that are set up via the bus 110 by the control processor 111. In some embodiments according to the invention, one can have extra transmitters 116 with signal generators 118 that do not include receivers. This allows for large transmit apertures with a narrow transmit focus, narrower than the receive focus. The receive focus can also be reduced with synthetic aperture techniques, known to anyone skilled in the art. This is done to reduce cost and/or save power consumption as the transmit channels do not require expensive AD converters. The transmit pulse can be triggered by a signal on the bus or through other means. The signal generators 108/118 for example, provides a delayed pulse transmit, where the delay is set for adequate focusing and direction steering of the transmit beam. The signal generators can also vary the amplitude between different transmitters for transmit apodization of the transmit aperture. The amplitude and/or delay can also include corrections for wave front aberrations in heterogeneous tissue.

The receive amplifiers have a back connection 109 that in the embodiment of FIG. 1*a* feeds the outputs of the receiver amplifiers to one of the inputs of many-to-one multiplexers (MUXes) 112, whose outputs are fed to inputs of analog to digital converters (ADCs) 113. The MUXes do in this embodiment represent an ADC connection means where in other embodiments the MUXes could be substituted with a direct connection as the ADC connection means. The ADCs are sampling and converting to digital form their analog inputs at a sample rate $f_s$, which in some embodiments could be controlled by the processor 111 through the bus 110. The ADC-blocks may include at their input an analog anti-aliasing filter to match the bandwidth of the analog inputs to the Nyquist frequency of the AD sampling, or an anti-alising filter may be placed at the output of the receiver amplifiers or similar, according to known methods. The band-width of the anti-aliasing filter is preferably programmable so that it can be adapted to the effective Nyquist rate, where multiple ADCs are used for each analog channel to increase the sampling rate to $Mf_s$, as discussed in relation to FIG. 2*b* and FIG. 3*d* below. Where one wants to image the $1^{st}$ harmonic components of the received analog channel signal, the anti-aliasing filter could be set to suppress $2^{nd}$ harmonic components in the signals. If the effective sampling Nyquist rate is adequately high above the $2^{nd}$ harmonic component, one could use digital filtering to suppress the $1^{st}$ harmonic components to enhance the $2^{nd}$ harmonic components, or suppress the $2^{nd}$ harmonic component to enhance the $1^{st}$ harmonic component through digital filtering in the signal processing after the beam former, all according to known methods. The output of the ADCs are fed to a digital beam forming unit 114 that can be programmed by the control processor 111 as described below.

The array coupling means 102 connects selected analog channels to selected sets of J transmitter and receiver amplifiers, where the minimum value of J is one as illustrated in FIG. 1*a*. In this embodiment, the MUXes 112 are configured so that for each $2^{nd}$ sample they connect the upper and lower (A and B) analog channels to the ADCs. The ADC outputs are synchronously separated into the two analog channel signals in the beam forming unit 114, that sorts the ADC outputs into samples of the signals from individual analog channels, phase corrects and/or amplitude corrects and/or delay corrects the individual channel signals before they are summed to form beam formed RF signal 115 from selectable beam directions. For each transmit pulse one can form a single or multiple beam signals from neighboring beam directions in parallel, according to known methods. The beam forming unit can in some embodiments be configured to do phase and/or amplitude and/or delay modifications of the signals to correct for wave front aberrations in heterogeneous tissue. Said beam forming unit can comprise one or more of field programmable application specific circuits (ASICs) or field programmable gate arrays (FPGAs) or even beam forming in a general, software programmable computer, like a PC, for example also with assistance processors like graphics processors. The control processor can be integrated with the beam forming computer. Hence, each ADC is converting L=2 analog channel signals, each signal with an effective sampling frequency $f_s/L$.

In another embodiment according to the invention, sub-aperture beam forming circuits in the probe connect several sub-apertures to the beam former through the same analog channel through time multiplexing (time sampling) the signal from several sub-apertures through the same analog channel. The ADC sampling points are then synchronized with the time-multiplex sampling according to well known methods, so that the ADC outputs generates the digital samples for the different sub-apertures connected to the same analog channel in a time series. The digital samples are then sorted in the digital beam former unit into samples from the different sub-apertures. This produces a similar reduction in the effective sampling rate, as the use of multiplexers, with a similar increase in the effective number of analog channels. However, with the time-multiplex one do reduce the required number of cables connecting the probe and the beam former.

Figure 2:
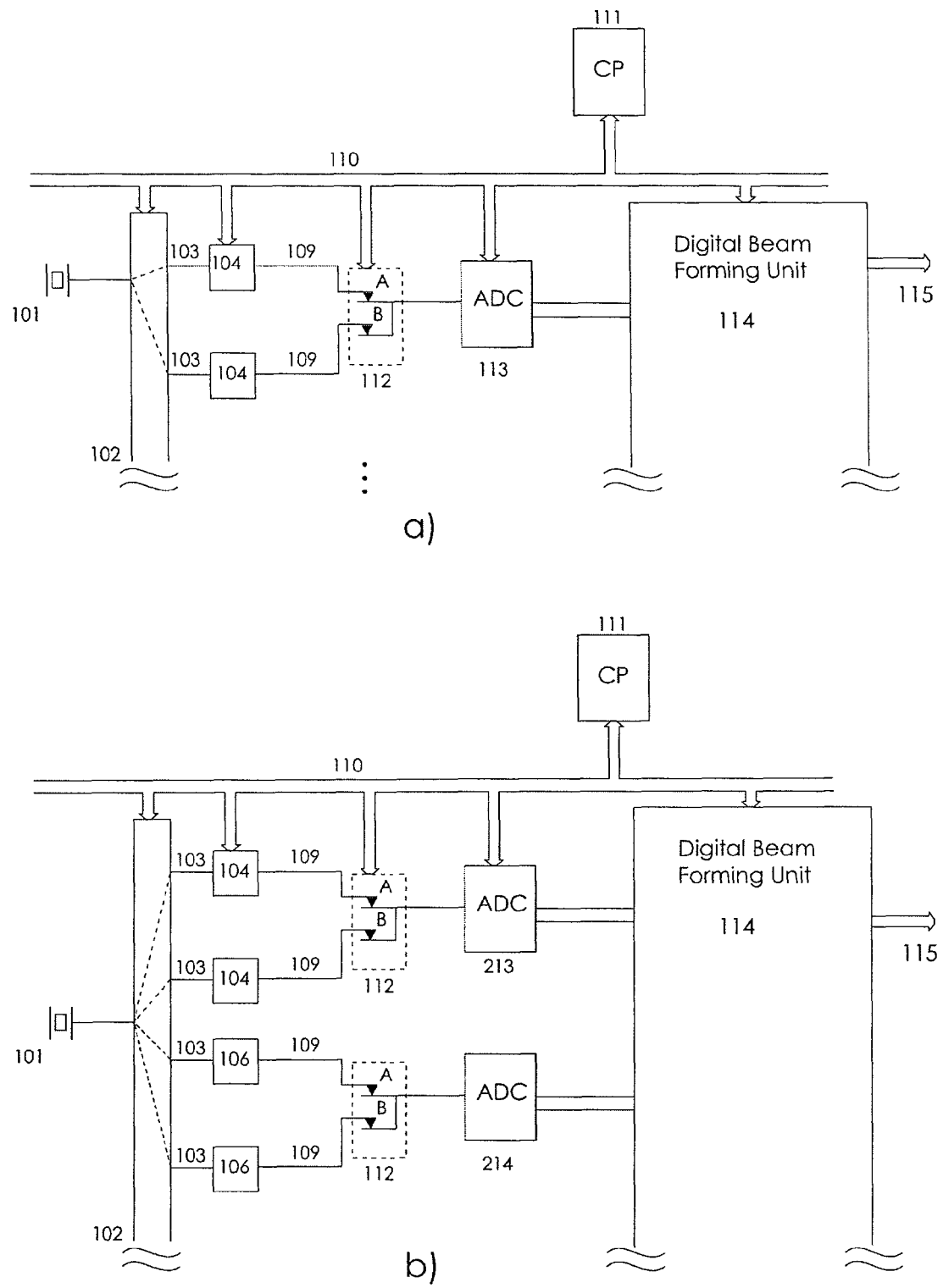
FIG. 2, shows other configurations of the front end in FIG. 1, that provides other sampling frequencies with other number of analog channels.
Figure 2:
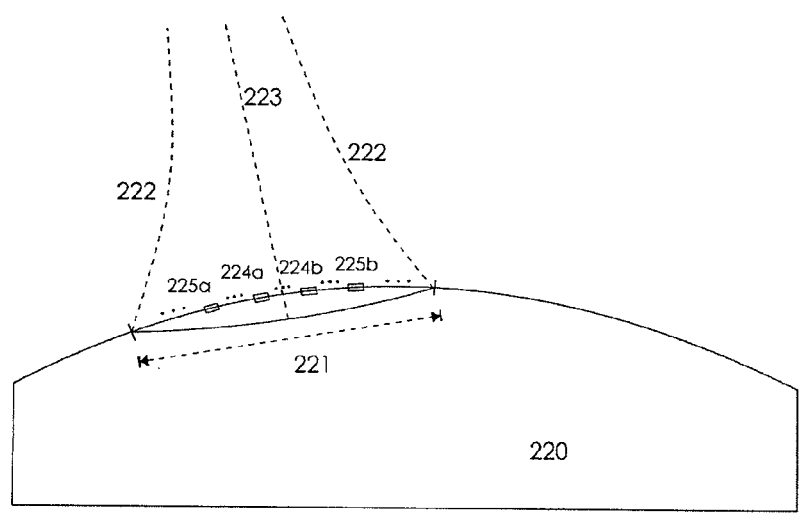
Figure 2:
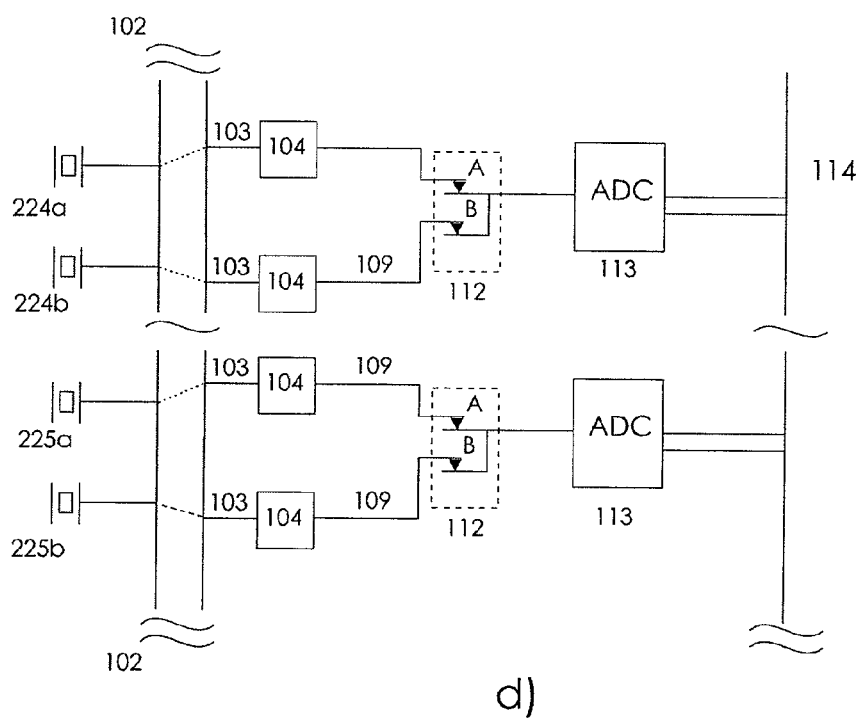
Figure 3:
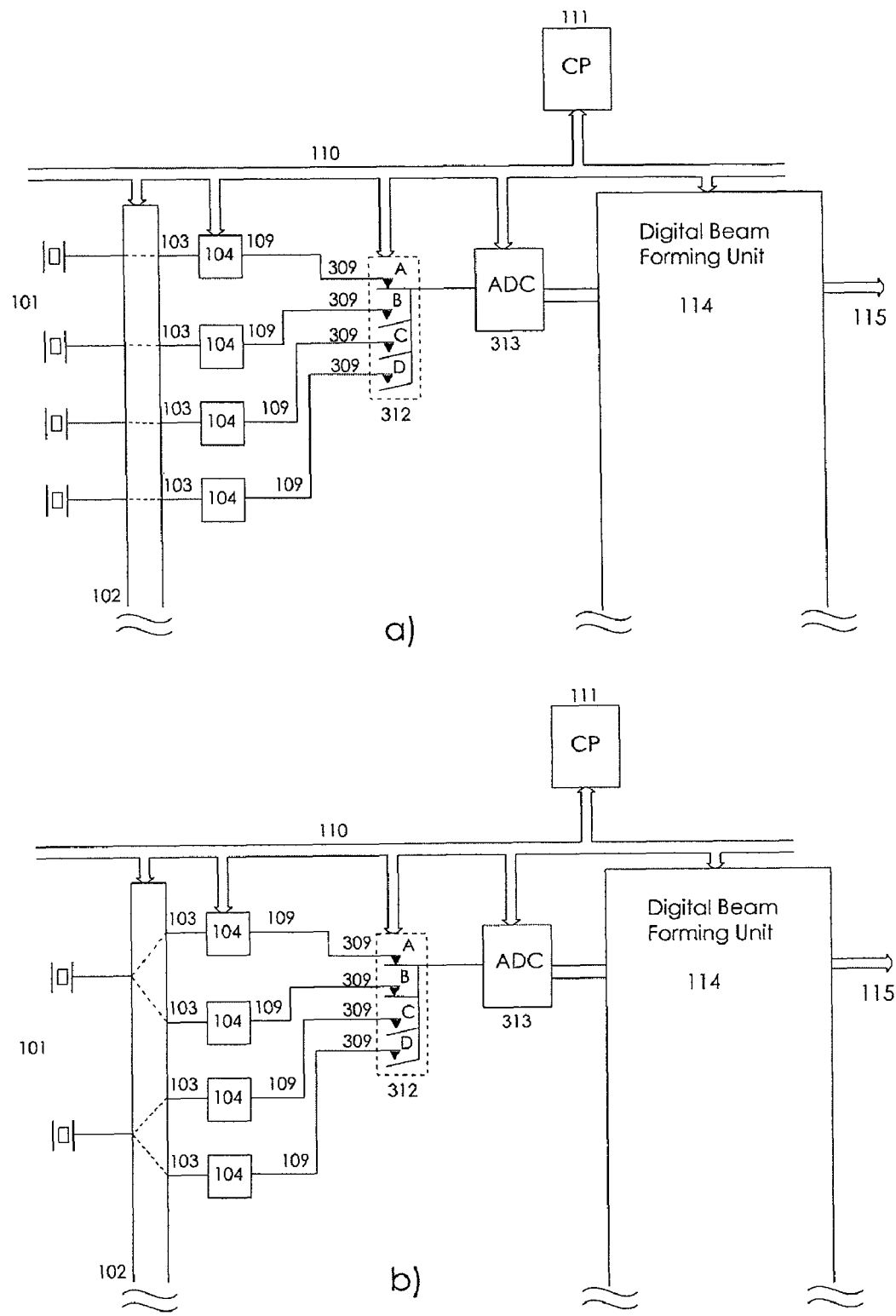
FIG. 3, shows yet another example embodiment of a front end according to the invention with four different configurations with different sampling frequencies and maximal number of analog channels.
Figure 3:
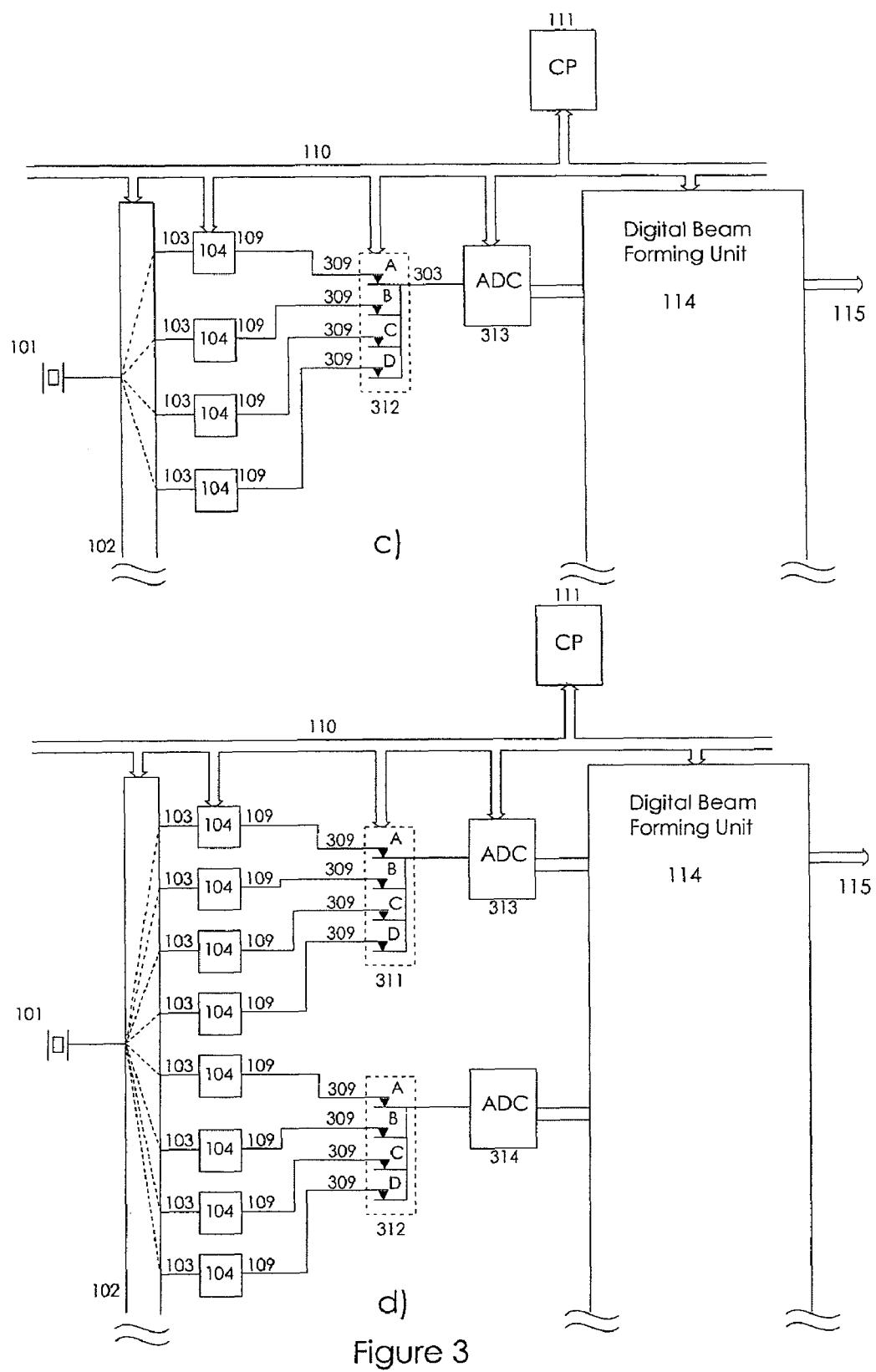

Other values of J are shown in FIGS. 2 and 3, where FIGS. 2*a* and 2*b* show connections with J=2 and 4, respectively, and FIG. 3*a* to 3*d* show connections with J=1, 2, 4, 8 respectively. The connection selection can in its simplest form be done in a probe connector that couples the analog channels to the ultrasound beam former, where the number of receivers and/or transmitters that connects to each analog channel is hardwired in the probe connector. The actual coupling to the transmitters and receivers to the analog channels is stored by a code in the probe connector that in this embodiment can be read by the control processor 111 over the bus 110 so that the control processor has information about the analog channel to transmitter/receiver connections for a particular probe. In a more flexible embodiment, the array coupling means 102 can contain flexible multiplexers that are set up by the control processor 111 over the bus 110, so that one can have selectable analog channel to transmitter/receiver connections for one particular transducer array, in a manner known to anyone skilled in the art.

In conjunction with the various couplings between the analog channels and the transmitters and receivers, MUXes are set up for matched functioning as illustrated in FIGS. 2 and 3.

FIG. 2*a* shows a situation where each analog channel is connected to two receive amplifiers (J=2) and the ADC multiplexers 112 are programmed so that both switches A and B are connected simultaneously. The signal from each analog channel is then sampled and AD converted at the sample rate $f_s$ of the ADCs. FIG. 2b shows yet another configuration of the front end, where each analog channel is coupled to four receive amplifiers (J=4). Both of the shown AD converters, 213 and 214, are then receiving the same analog channel signals at their inputs which are sampled and AD converted at the rate $f_s$. The outputs of the ADCs 213 and 214 can then be summed to increase the dynamic range of the digital representation of each analog channel. In another operation according to the invention the sampling time points of ADC 214 are delayed $1/Mf_s$, with M=2 in this example, in relation to those of the ADC 213, and the signals from the two ADCs are merged in the beam forming unit 114 into one digital signal for the selected analog channel with effective sampling rate $Mf_s$. Analog anti-aliasing filters at the input of the ADCs are now typically set for an effective Nyquist rate of $Mf_s/2$. Unaccuracies in the delays of $1/Mf_s$ between the sample points of different AD converters, can be compensated for in the beam forming unit 114, according to known methods.

The setup in FIG. 2b can also be used in yet another operation according to the invention, where the sampling time points of ADC 214 are delayed approximately $1/4f_0$ in relation to those of the ADC 213, where $f_0$ is chosen close to the center of the receive frequency band, or often the $1^{st}$ or $2^{nd}$ harmonic parts of the receive frequency band. The digital outputs of the ADC 213 and 214 then represent the in-phase and the quadrature components (I-Q components) of the received RF signal that is inputted to the two ADCs 213 and 214. The interval between the sample points for each ADC (sampling frequency) is adjusted so that they satisfy the sample frequency requirements for the I-Q representation of the signal bandwidth, according to known methods.

The beam forming unit 114 are then configured to sort the ADC outputs into I-Q samples of the analog channels and performs quadrature beam forming according to known methods. This quadrature method of beam forming then allows the use of the highest ultrasound frequencies with a given sampling frequency. We have said that the delay can be approximately $1/4f_0$ as any deviation from this value can be adjusted for in the quadrature beam former according to known methods.

The digital beam forming unit 114 is programmable to adapt to the different configurations in FIGS. 1-3. In the operation indicated in FIG. 1a, the outputs of each ADC are in the digital beam forming unit 114 sorted into samples for the 2 analog channels, with effective sampling frequency $f_s/2$ per analog channel. In this configuration the beam former can handle a phased array with 2N analog channels with angular direction steering of the beam. The beam former can in this configuration also handle a switched array with aperture of 2N analog channels and angular direction steering of the beam.

With the operation indicated in FIG. 1a and FIGS. 2a and b, the digitized signals represent individual analog channels, which could handle phased and switched arrays with angular direction steering of the beam. For a switched array without angular direction steering of the beam, one can add the analog signals of the pair of analog channels that have symmetrical location around the aperture center, where the sum is digitized by the same ADC. This allows the beam former to operate switched array apertures without angular direction steering of the beam with twice as many analog channels as with direction steering of the beam. In the following we refer to apertures without direction steering of the beam as symmetric delay apertures, and with direction steering of the beam as asymmetric delay apertures.

This situation is illustrated in FIG. 2c, where 220 shows a side view of a slightly curved array where a group 221 of elements or sub-apertures of elements have been selected for an active aperture to produce an ultrasound beam indicated with the lines 222 and the beam center axis 223. The analog channels have a pair-wise symmetric positioning around the aperture center, indicated by the example analog channel pairs 224a,b and 225a,b. The array coupling means 102 is in this example a multiplexer or cross-point switch that connects symmetric pairs of analog channels to the transmit/receive amplifiers that are connected to the same ADC multiplexer, as illustrated in FIG. 2d. The multiplexers 112 are in this example designed together with the receiver amplifier outputs so that their output produces the sum (current sum or voltage sum) of the pair analog channel signals as inputs to the ADCs 113 that provides the digitized sum signal to the digital beam forming unit 114, where the signals are appropriately delayed, amplitude scaled and summed to form a dynamically focused beam with beam central axis 223 normal to the array surface. In a modified embodiment, the signals from the paired analog channels around the beam axis, can be summed before the transmit/receive amplifiers by multiplexers in the array coupling means, and the transmit/receive amplifiers, multiplexers, ADCs, and beam forming unit operating as each sum of symmetric analog channel signals was a single signal.

In the configuration of the beam former shown in FIG. 2b, the output of two paired ADCs are merged into the digital representation of one analog channel signal in the digital beam forming unit 114 to give an effective sampling frequency of the analog channel signal of $2f_s$, or I-Q sampling of the analog channel signal as discussed above.

By example, with ADCs operating at $f_s=100$ MHz, the setup indicated in FIG. 1 gives an effective beam former sampling frequency of $f_s/2=50$ MHz (L=2) with a highest ultrasound center frequency ~15 MHz operating asymmetric delay apertures of 2N transducer analog channels and symmetric delay apertures of 4N analog channels. The configuration in FIG. 2a gives an effective sampling frequency of $f_s=100$ MHz (L=1) with a highest ultrasound center frequency of ~30 MHz operating an asymmetric delay aperture of N transducer analog channels, and symmetric delay apertures of 2N analog channels. The configuration in FIG. 2d gives an effective sampling frequency of $f_s=100$ MHz (M=1) with a highest ultrasound center frequency of ~30 MHz and operates switched arrays with symmetric delay apertures of 2N analog channels. The configuration in FIG. 2b gives in the $1^{st}$ embodiment (RF-mode of operation) an effective beam former sampling frequency of $2f_s=200$ MHz (M=2) with a highest ultrasound center frequency of ~60 MHz operating N/2 transducer analog channels with asymmetric delay apertures, and N transducer analog channels with symmetric delay apertures.

With the quadrature sampling embodiment described above, the configuration in FIG. 2b gives an I-Q sampling frequency of $f_s=100$ MHz adapted for an RF signal band width of 70 MHz that can be found with ~100-150 MHz center frequencies for an asymmetric delay aperture of N/2 analog channels and a symmetric delay aperture of N analog channels.

One should also note that an increase in the digital signal dynamic range can be obtained for low signal bandwidths by using a higher than necessary sampling frequency, and reducing the sampling frequency through digital low pass filtering. Hence, for a N analog channel array with asymmetric delay aperture with so low signal bandwidth that $f_s/2$ is an adequate sampling frequency, one can use an effective sampling frequency $f_s$ and through low pass filtering reduce the sampling frequency to $f_s/2$ with an increase in the effective dynamic range of the digital signal by the square root of 2. Similarly, for an array of N/2 analog channels with asymmetric delay aperture and bandwidth where $f_s/2$ is an adequate sampling frequency, one can sample the signal at $f_{sa}=2f_s$ and through low pass filtering reduce the sampling frequency to $f_{sa}/4=f_s/2$ with an increase in the digital signal dynamic range of 2. With symmetric delay apertures one can do the same with 2N and N analog channels. When two ADCs operates the same analog channel without delay between the samples, one can sum the ADC outputs and obtain a similar increase in the digital dynamic range.

FIG. 3 shows yet another example embodiment according to the invention, where the multiplexers 312 now connect 4 inputs 309 to one output. The ADCs 313 and 314 convert their analog inputs at a sample rate $f_s$. In the configuration of FIG. 3a, each analog channel 101 is connected to a single receiver amplifier (J=1) so that each analog channel signal connects to only one multiplexer input. The switches A, B, C, and D are connected in a sequence, so that the ADC 313 in a sequence is sampling and AD converting each of the 4 analog channel signals of the connected multiplexer with an effective sampling rate $f_s/L$ where L=4. In the configuration of FIG. 3b, each analog channel 101 is connected to 2 receiver amplifiers (J=2). The switches (A, B) and (C, D) are connected in parallel in a sequence, so that the analog channel signals are each sampled at an effective rate $f_s/L$ where L=2. In the configuration of FIG. 3c, each analog channel 101 is now connected to 4 receiver amplifiers (J=4), and all switches A, B, C, D are connected in parallel so that each analog channel signal is sampled at the effective rate $f_s/L$ with L=1.

FIG. 3d shows a configuration of the front end with 4-to-1 multiplexers, where each analog channel 101 is connected to 8 transmitters/receivers (J=8), and all the switches A, B, C, D of the multiplexers 311 and 312 are connected in parallel so that both ADCs 313 and 314 are sampling the same analog channel signal at a rate $f_s$. In a $1^{st}$ embodiment according to the invention, the sampling time points of ADC 314 are delayed $1/Mf_s$ (M=2) in relation to those of ADC 313, and the signals from the two ADCs are merged in the beam forming unit 114 into one digital signal for the selected analog channels with effective sampling rate $Mf_s$, similar to that in FIG. 2b.

In a $2^{nd}$ embodiment similar to the $2^{nd}$ embodiment for FIG. 2b, the configuration in FIG. 3d can also be used in a quadrature beam former mode, where the sampling time points of ADC 314 are delayed approximately $1/4f_0$ in relation to those of the ADC 313 and the sampling frequency $f_s$ is chosen for adequate I-Q sampling determined by the RF-bandwidth of the analog channels. The digital outputs of the ADC 313 and 314 then represent the in-phase and the quadrature components of the connected analog channel that is inputted to the two ADCs 313 and 314. The beam forming unit 114 is then configured for quadrature signal beam forming according to known methods. This quadrature method of beam forming then allows the use of the highest ultrasound frequencies with a given sampling frequency, as described above.

With no angular direction steering of the beam, one can for the 4-to-1 multiplexers in FIG. 3 set up the array coupling means for symmetric delays around the aperture center similar to FIGS. 2c and 2d, so that the beam former operates switched array symmetric delay apertures with twice the number of analog channels as with asymmetric delay apertures.

In a $3^{rd}$, modified embodiment according to the invention, the multiplexers can be left out and the back connection of the receiver amplifiers of FIG. 2 (and FIG. 3) are connected directly to the ADC inputs. The main configurability of the beam former is then between a RF beam former where the effective sampling rate is $Mf_s$ (M=1, 2,)>appr. 3* (RF-frequency), and a quadrature beam former where the sampling rate for each quadrature channel is adapted to the bandwidth of the analog channel signals. One can then by the coupling in the array coupling means 102 select how many ADCs are connected to each analog channel, where in the RF-mode of the beam former the RF sampling frequency can be increased by a factor M with a subsequent reduction in analog channels of the factor M by coupling M subgroups of ADCs to each analog channel with a delay of the sampling between each of the M groups of $1/Mf_s$. In the quadrature mode of the beam former one connects 2 quadrature sub groups of ADCs to each analog channel with a delay shift close to $1/4f_0$ between the samplepoints of the quadrature subgroups of ADCs, where the outputs of the $1^{st}$ and $2^{nd}$ of said 2 quadrature subgroups of ADCs are in said digital beam forming unit sorted to form samples of the in-phase and the quadrature component, respectively, of I-Q demodulated RF signal for each analog channel. With this embodiment where the MUXes are taken out, one can not increase the number of analog channels by a factor L with a corresponding reduction in sample frequency of $f_s/L$.

In the example configurations of FIGS. 1a and 3a, the array analog channels are coupled to a single transmitter/receiver amplifier for the lowest sampling frequency $f_s/L$ (L=2 in FIG. 1a and L=4 in FIG. 3a), while with increasing sampling frequencies an increasing number of transmitter/receiver amplifiers are coupled in parallel to each analog channel. This parallel coupling is in most situations advantageous as the increasing sampling rate is used with increasing center frequency of the array elements, and the electrical element impedance is most often reduced with increasing center frequency. The Noise Figure of the receiver is then improved by coupling more receiver amplifiers in parallel for each element, and the parallel coupling of transmit amplifiers provides improved transmit drive capability of the array elements.

If for some reason, the area or the material of the array elements are varied so that the electrical impedance of the array elements has limited or no drop with increase in center frequency, one can set up the array coupling means 102 and the multiplexers so that adequate sampling frequency is obtained with less transmit/receive amplifiers coupled to each element, in a manner that is clear to anyone skilled in the art, based on the disclosures so far. For example, one could in FIGS. 2a and b set up the array coupling means and the multiplexers so that only the upper transmit/receive amplifiers is used where the switch A is closed and switch B is open all the time. Similarly, in FIG. 3b one could couple either one or two (J=1 or 2) transmit/receive amplifiers to each array element, while in FIG. 3c one could select between J=1, 2, 3, and 4 transmit/receive amplifiers coupled to each element. In FIG. 3d one could similarly select between J=2, 4, 6, and 8 transmit/receive amplifiers coupled to each array element, and still be able to obtain a sample frequency of each array element signal of $2*f_s$ by merging the outputs of the ADCs 313 and 314 into one element signal in the beam forming unit. The front end can hence not only be configured for variable sampling frequency in relation to the center frequency of the actual array, but also to variable electrical element impedance so that best Noise Figure of the receiver and drive capabilities of the transmitter is achieved.

With annular arrays, one has the fewest number of elements for a given area of the aperture, and hence also the largest element area and the lowest electrical element impedance for each element. For arrays with low number of elements with large area, one can conveniently couple a larger number of transmitter/receiver amplifiers to the same element for best Noise Figure of the receiver and also drive capabilities of the transmitter, compared to that shown in the FIGS. 2b and 3d. The receiver amplifiers are then coupled to a channel group of ADCs that for example all can be operated with the sampling time points at sampling frequency $f_s$, where the outputs of the ADCs can be added to increase the dynamic range of the digital signal representation. This channel group of ADCs can be divided into M subgroups with a sampling delay between each subgroup of $1/Mf_s$ so that the ADC outputs can be sorted in the digital beam former unit into samples of the analog channels at an effective sampling frequency $Mf_s$. If there are more than one ADC in each subgroup, one can add the ADC outputs of the subgroup ADCs to increase the dynamic range of the digital signal representation. If M is so large that there is only one ADC in each sub-group, and the effective sampling frequency $Mf_s$ represents an over-sampling of the signals, one can low pass filter the digital signals to adequate bandwidth, and reduce the LF filter output sampling rate, according to known methods. A large M with this type of low pass filtering, then produces the same increase in dynamic range of the digital signal representation with the same resulting sampling rate, as using a lower value of M with more than one ADC in each subgroup and summing the outputs of the ADCs in each subgroup.

For quadrature beam forming, the number of ADCs would for each analog channel in addition be divided into 2 quadrature subgroups of ADCs with a delay shift close to $\frac{1}{4}f_0$ between the samplepoints of the quadrature subgroups of ADCs, where $f_0$ is chosen close to the center frequency of the $1^{st}$ or the $2^{nd}$ harmonic RF frequency band of the analog channels, where the outputs of the $1^{st}$ and $2^{nd}$ of said 2 quadrature subgroups of ADCs are in the digital beam forming unit sorted to form samples of the in-phase and the quadrature component, respectively, of I-Q demodulated RF signal for each analog channel. The control processor then configures the beam former unit to sort the ADC outputs into I-Q samples of the signals from the analog channels with a sampling rate that satisfies the sampling theorem of for each I-Q channel, and perform quadrature beam forming of the signals, as discussed in relation to FIG. 2b and FIG. 3d. One can hence for low element number arrays have more than one ADC per quadrature channel different to what is shown in the example of FIGS. 2a and 3d. The outputs of the different ADCs for each quadrature channel can be added in the beam forming process increasing the dynamic range of the digital signal representation. This situation applies in particular to annular arrays which have a small number of large elements.

A particular design of an annular array is given in U.S. Pat. No. 6,622,562, where the outer elements have wider area, and hence lower electrical impedance, than the inner elements. The number of transmitters/receivers and the number of ADCs operating the analog channel from each element should then be proportional to the element area. This favors a solution where the area of the outer elements is selected as a rational number times the area of the inner elements, so that each transmitter/receiver and ADC handles signals from the same element area, and hence also electrical impedance, for all elements. This is also the case for 1.5D and 1.75D linear arrays where the central group of elements often can have larger area than the outer elements in the elevation direction.

The example embodiments above hence illustrates basic principles of a digital beam former that is configured by a processor to operate either in a RF-sampling mode or an I-Q sampling mode with different sampling frequencies and number of transducer elements, the beam former making optimal use of the ADCs for highest possible number of transducer elements at a given ultrasound frequency, and being able to adapt the effective sampling frequency to higher ultrasound frequencies where less number of transducer elements are needed for the beam forming, and the transmitter/receivers are parallel coupled to adapt to the reduced impedance of the higher frequency transducer elements. Essential in this configurability is the programmable beam forming unit 114, that can be adapted for each particular array element to ADC configuration.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention.

It is also expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A processor configurable digital ultrasound beamformer for steering at least one of the direction and the focus of an ultrasound beam from a plurality ultrasound transducer arrays of different types with variable number of array elements and frequencies, wherein signals from array elements of the transducer arrays or sub-aperture groups of the array elements represent analog channels, and wherein said beamformer comprises:
   a set of analog transmitters and receivers, each transmitter comprising a transmitter amplifier and each receiver comprising a receiver amplifier having a receiver output;
   an array coupling device that couples the analog channels to the front connections of one or more of the transmitters and receivers;
   N analog to digital converters (ADCs) operating at a conversion rate $f_s$, N being a whole number, and wherein an ADC input of each ADC is coupled to a respective one of the receiver outputs of the receiver amplifiers via an ADC connector, wherein said ADC connector is one of a direct connection between the receiver outputs and the ADC inputs, and a set of N multiplexers (MUXes), wherein inputs to the MUXes are the receiver outputs and outputs of the MUXes connect to the ADC inputs;

a programmable digital beam forming unit to which ADC outputs of said ADCs are coupled as inputs, said digital beam forming unit being configurable to sort the outputs of said ADCs into digital samples of received signals from said analog channels, configured to provide phase, delay, and amplitude modifications of said sorted signals to produce modified signals, and configured to combine the modified signals into one or more beam signals; and a control processor configured to selectably configure a functional operation of the beam former through interaction with at least said array coupling device and said beam forming unit, and configured to couple a selectable number of ADCs to sample signals from each analog channel, wherein said beam forming unit sorts the ADC outputs into samples of signals from individual array elements or sub-aperture groups of elements, and to perform beam forming of the analog channels into one or more beam signals.

2. A processor configurable digital ultrasound beamformer according to claim 1, wherein said control processor is configured to subdivide the number of ADCs that operate each analog channel into M subgroups of ADCs with a time delay shift $1/Mf_s$ between the sample time points of the M subgroups of ADCs, and the control processor is configured to control the digital beam-forming unit to sort the outputs of said M subgroups of ADCs to form samples of the signals from the analog channels with an effective sampling rate for each analog channel increased by a factor M where a maximal number of analog channels that can be combined to form beam signals is decreased by the factor M.

3. A processor configurable digital ultrasound beamformer according ng to claim 1, wherein said control processor is configured to divide the number of ADCs that operate each analog channel into 2 quadrature subgroups of ADCs with a time delay shift close to $\frac{1}{4}f_0$ between the sample time points of the quadrature subgroups of ADCs, where $f_0$ is close to a center frequency of the signal that is digitized, and said digital beam-forming unit is configured to sort the outputs of said 2 quadrature subgroups of ADCs to form samples of in-phase and quadrature components, respectively, of an I-Q demodulated RF signal for each analog channel, with a sampling rate that satisfies sampling requirements for each I-Q demodulated RF signal, and perform quadrature beam forming of the analog channel signals into one or more beam signals.

4. A processor configurable digital ultrasound beamformer according to claim 1, wherein the control processor is configured to connect L analog channels at the inputs of each MUX in a recurring sequence to the output of each MUX, where L is a plural integer, and the control processor is configured to control the digital beam-forming unit to sort the ADC outputs into samples of a number of analog channels increased by a factor L at a sampling frequency reduced by a factor L, and perform beam forming of the analog channels into one or more beam signals.

5. A processor configurable digital ultrasound beamformer according to claim 4, wherein said multiplexers are configured to select to the output free subgroups of said multiplexer inputs in a sequence, the number of inputs in said subgroups being a value between one and a total number of multiplexer inputs.

6. A processor configurable digital ultrasound beamformer according to claim 1, further comprising:

circuits of an ultrasound probe that sample the signals from sub-apertures of array elements or sub-aperture circuits and transmits the sampled signals in time-multiplex on the analog channels to the input of the ADCs, wherein sample time points of the ADCs are synchronized to sample time points in the time multiplex transmission on the analog channels so that the ADCs digitizes the signals from said groups in a time-multiplex, and the beam-forming unit is configured to sort the ADC outputs into samples from individual array elements or sub-apertures of array elements followed by beam forming of the sorted signals into one or more beam signals.

7. A processor configurable digital ultrasound beamformer according to claim 1, wherein an ADC sample rate $f_s$ is adaptable to an actual received ultrasound frequency band.

8. A processor configurable digital ultrasound beamformer according to claim 1, wherein a number of the ADCs that are coupled to each analog channel is adaptable to an area of the array elements of the transducer arrays or the sub-aperture groups of the array elements forming each analog channel.

9. A processor configurable digital ultrasound beamformer according to claim 1, wherein the beam former is configured to selectably sum signals from analog channels symmetric around an aperture center before AD conversion such that when there is no direction steering of the ultrasound beam, a number of analog channels operated by the beam former is selectably doubled.

10. A processor configurable digital ultrasound beamformer according to claim 1, wherein a number of transmitter and receiver amplifiers connected to each analog channel is selectable by the control processor to adapt receiver Noise Figure and transmitter drive capabilities to actual analog channel impedances.

11. A processor configurable digital ultrasound beamformer according to claim 1, wherein the array coupling device comprises an electrical connector between a probe cable and said beam former.

12. A processor configurable digital ultrasound beamformer according to claim 1, wherein the digital beam forming unit comprises Field Programmable Gate Arrays (FPGAs).

13. A processor configurable digital ultrasound beamformer according to claim 1, wherein the digital beam-forming unit comprises Application Specific Integrated Circuits (ASICs).

14. A processor configurable digital ultrasound beamformer according to claim 13, wherein said general, software programmable computer is a personal computer (PC).

15. A processor configurable digital ultrasound beamformer according to claim 1, wherein the digital beam-forming unit comprises a general, software programmable computer.

16. A processor configurable digital ultrasound beamformer according to claim 1, wherein the digital beam-forming unit comprises a graphics processor.

17. A processor configurable digital ultrasound beam-former according to claim 1, wherein an effective sampling rate is set for over-sampling of the signal relative to a signal bandwidth, and the beam former comprises means for digital low pass filtering with reduction in filter output sampling frequency that filters the digitally converted analog channels to increase a dynamic range of a digital representation of the analog channels.

18. A processor configurable digital ultrasound beam-former according to claim 1, wherein said beam-former is configured to add a group of the ADC outputs representing samples of analog channels before beam forming to increase a dynamic range of a digital representation of the analog channels.

19. A processor configurable digital ultrasound beam-former according to claim 1, wherein said control processor is a PC that includes display and visualization elements configured for visualization of ultrasound images.

20. A processor configurable digital ultrasound beam-former according to claim 1, wherein the beam former unit includes means for phase delay and/or amplitude and/or time delay modifications to correct for wave front aberrations of the ultrasound beam in heterogeneous tissues.

21. A processor configurable digital ultrasound beam former for steering at least one of the direction and the focus of an ultrasound beam from a plurality of ultrasound transducer arrays of different types with variable number of array elements and frequencies, wherein each of the ultrasound transducer arrays is individually connectable to the beam former, said beam former comprising:
   K sets of analog transmit/receive circuits, each set containing a transmit amplifier and a receiver amplifier, K being a whole number,
   an array coupling device for coupling signals between array elements or groups of the array elements of an ultrasound transducer array of the plurality of ultrasound transducer arrays to inputs of groups of said transmit/receive circuits,
   N analog multiplexers that selectably connect outputs or sums of outputs of said receiver amplifiers to a single output, N being a whole number less than or equal to K,
   N analog to digital converters (ADCs) operating at a conversion rate $f_s$, wherein the input of each ADC is connected to an output of said N analog multiplexers in a one-to-one connection,
   at least one field programmable digital beam forming circuit to which the outputs of said ADCs are coupled as inputs, said at least one digital beam forming circuit being configured to sort the outputs of said ADCs into digital samples of received signals from the array elements or groups of array elements, introducing delay and amplitude modifications to the sorted signals and combining the modified, sorted signals into one or more beam signals, and
   a functional control processor at least enabled to selectably configure a functional operation of the beam former through interaction with said array coupling means, said multiplexers, and said at least one beam forming circuit, so that the ADC conversion and beam forming takes form as one of:
   a) for each ADC, L of the received signals from the array elements or groups of array elements are in a recurring sequence connected to said each ADC and converted sequentially by said each ADC so that each of said signals are sampled and converted with a sample rate $f_s/L$, said at least one beam forming circuit being configurable by said control processor to separate the outputs of said ADCs into signal samples from each individual one of the array elements for beam forming to operate the ultrasound transducer array with L*N elements where the signal from the each individual one of said array elements is sampled at a frequency $f_s/L$, wherein L is the number of array elements or groups of elements connected to each ADC in the recurring sequence, and
   b) the number of N ADCs are subdivided into groups with M ADCs in each group, where each of said groups of M ADCs converts a received signal from said array elements or groups of said array elements, with a delay shift between the M ADCs in each group of $1/Mf_s$, and the at least one digital beam forming circuit being configured to use the outputs of said groups of M ADCs to form samples of said signals with sampling rate $Mf_s$, said control processor controlling said at least one beam forming circuit to separate the outputs of said ADCs into signal samples from each individual one of the array elements for beam forming to operate the ultrasound transducer array with N/M elements where the signal from each of the each individual one of said array elements is sampled at a frequency up to $M*f_s$,
   wherein both forms of the ADC conversion and beam forming are configured to perform electronic direction steering of the beam.

22. The ultrasound beam former according to claim 21, wherein said at least one field programmable digital beam forming circuit comprises a Field Programmable Gate Array (FPGA).

23. The ultrasound beam former according to claim 21, wherein said at least one field programmable digital beam forming circuit comprises an Application Specific Integrated Circuit (ASIC).

24. The ultrasound beam former according to claim 21, wherein said multiplexers are programmed to select subgroups of said multiplexer inputs and send the selected subgroups to an output of the multiplexers in a sequence, the number of inputs in said subgroups being a value between one and a total number of multiplexer inputs.

25. The ultrasound beam former according to claim 24, wherein the number of transmit/receive circuits connected to each of the array elements is selectable by the control processor to optimize a receiver Noise Figure and transmitter drive capabilities for an electrical impedance of the array elements.

26. The ultrasound beam former according to claim 21, further comprising at least one digital low pass filter, wherein the sampling rate $f_s/L$ or $Mf_s$ is configured to oversample of the received signal relative to a signal bandwidth, and the at least one digital low pass filter filters the received signals to obtain an increase in a number of bits in a signal representation with a resulting sample rate that matches the signal bandwidth.

27. The ultrasound beam former according to claim 21, further comprising a PC with a display, wherein said control processor is part of the PC, and the PC is configured for visualization of ultrasound images on the display.

28. The ultrasound beam former according to claim 21, wherein said at least one beam former circuit includes means for delay and amplitude modifications to correct for phase front aberrations of an ultrasound wave in heterogeneous tissues.

29. The ultrasound beam former according to claim 21, wherein when the ADC conversion and beam forming exclude a capability of electronic direction steering of the ultrasound beam, the beam former is operable with arrays having twice a number of array elements by analog summation of paired element signals that are symmetric around an aperture center before digital conversion.

30. The ultrasound beam former according to claim 21, wherein the array coupling device comprises a hardwired connection configured to connect the beam former to the ultrasound transducer array or selectable electronic switches configured to connect the beam former to the ultrasound transducer array.

* * * * *